Oct. 23, 1934.  E. M. BRODERSEN  1,977,818
FILTER
Filed July 13, 1933
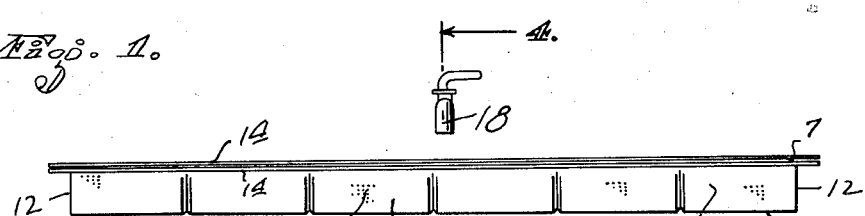
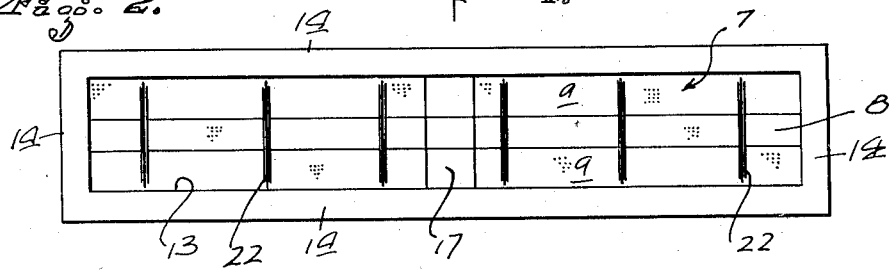
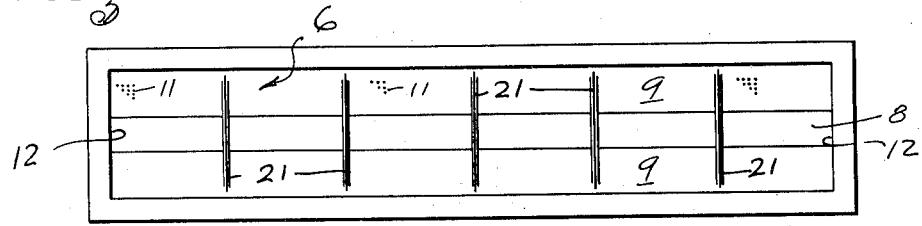
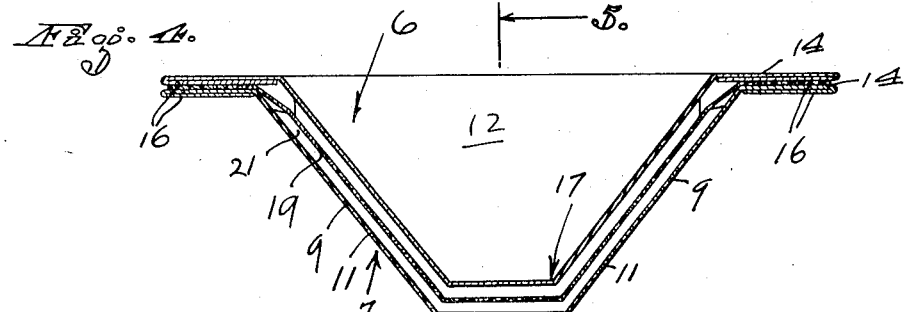
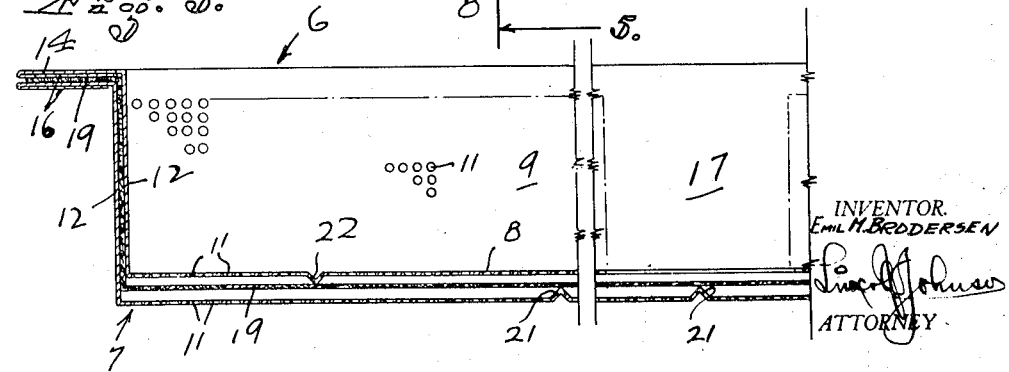
INVENTOR.
Emil M. Brodersen
ATTORNEY Patented Oct. 23, 1934

1,977,818

UNITED STATES PATENT OFFICE 1,977,818

FILTER

Emil M. Brodersen, Alameda, Calif.

Application July 13, 1933, Serial No. 680,203

2 Claims. (Cl. 210—155)

This invention relates to fluid strainers.

The primary object of the invention is to provide a fluid strainer, and particularly a milk strainer, which is highly efficient and which is protected from being readily worn out by the force of the stream of fluid introduced therein, and in which a sheet of filter material is so arranged as to be readily replaceable.

Other objects and advantages are to provide a fluid strainer that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawing wherein,

Fig. 1 is a side view of the strainer.

Fig. 2 is a top plan view of the strainer.

Fig. 3 is a top plan view of the bottom or outer trough of the strainer.

Fig. 4 is a cross sectional view of the strainer, the section being taken on the line 4—4 of Fig. 1.

Fig. 5 is a longitudinal fragmental sectional view of the strainer, the section being taken on the line 5—5 of Fig. 4.

In carrying out my invention I make use of a strainer formed of an outer or bottom trough 6 into which is placed an inner or top trough 7. Each trough is made of a substantially V-shaped cross section with a flattened bottom 8 and inclined longitudinal sides 9. The bottom 8 and the sides 9 are perforated to provide holes 11 through which fluid may pass. The ends of each trough are obstructed by imperforate end walls 12.

At each edge of the open top 13 of each trough is formed an outwardly extended flange 14. Each flange is doubled back over its under side as at 16, and extended back to the respective side 9 or end wall 12. The free edges and joining edges of all the flanges 14 and doubled portions 16 are integrally united with each other, preferably by welding, so as to form continuous, smooth rim surfaces, thereby to facilitate cleaning of the troughs.

The inner or top trough 7 has an imperforate, or solid strip 17 formed therein, transversely intermediate the ends thereof. The strip 17 forms both the bottom and the sides of the trough 7 at the said intermediate point, which is opposite the faucet or nozzle 18, from which the fluid or milk is introduced in to the top trough 7. This arrangement prevents the rapid wearing of the top trough 7 by the force of the stream of liquid introduced thereinto, and also provides for uniform longitudinal and lateral distribution of the liquid throughout the entire length of the top trough 7. It also protects a sheet of filter material 19 disposed between the troughs 6 and 7. If the stream of liquid from the nozzle 18 were directed on a perforated strainer, it would wear out the sheet of filter therebelow, after a very short use.

The bottom trough 7 is transversely indented on its inner face to form inwardly protruding spaced ribs 21 on the sides 9 and bottom 8 of the said trough 6. The inner or top trough 7 has transverse indentations on its outer face arranged to form outwardly protruding ribs 22 on the bottom 8 and sides 9 of the trough 7. The ribs 21 and 22 are of substantially the same depth.

The ribs 21 and 22 are staggered relatively to each other, so that the ribs 22 protrude in the spacing between the respective ribs 21. The ribs 21 and 22 not only assist in properly spacing the troughs 6 and 7 from each other, but also grip the filter sheet 19 therebetween to hold the same in place.

In operation, the filter sheet 19 is placed in the bottom trough 6, then the top trough 7 is placed in position, holding the sheet 19 in place. The strainer is placed below the nozzle 18, so that the solid strip 17 is opposite the said nozzle. The milk flowing from the nozzle 18 flows uniformly in both directions from the strip 17 and fills the top troughs 7. The perforations 11 of the bottom trough 6 are offset relatively to the perforations 11 of the overlying trough 7 to prevent direct passage of milk or other liquid therethrough. The milk trickles through the top perforations 11, and through the filter sheet 19, out through the outer perforations 11 of the trough 6 and is collected in a container or vessel suitably disposed below the strainer.

The filter sheet 19 may be readily replaced by removing the top trough 7. The cleaning of the trough is easy, due to the smooth flange surfaces. The troughs 6 and 7 are preferably made of non-corrosive metal.

Having thus described this invention, what I claim and desire to secure by Letters Patent is:

1. A fluid strainer consisting of a pair of open top troughs arranged in nested relationship, the end walls of said troughs being imperforate and snugly engaging each other, and the side and bottom walls of said troughs being perforated and spaced from each other; ribs on the outside of the side and bottom walls of the inner trough arranged in staggered relationship to ribs formed on the inside of the side and bottom walls of the outer trough; and a sheet of filtering material held between the opposite end walls of the nested trough and maintained in spaced relation with the side and bottom walls of the inner and outer troughs by the staggered ribs thereon.

2. A fluid strainer consisting of a pair of open top V-shaped troughs arranged in nested relationship, the end walls of said troughs being imperforate and snugly engaging each other, and the side and bottom walls of said troughs being perforated except for an imperforate strip formed on the inner trough between the ends thereof at a point opposite where the fluid is introduced into the trough and spaced from each other; ribs on the outside of the side and bottom walls of the inner trough arranged in staggered relationship to ribs formed in the inside of the side and bottom walls of the outer trough; and a sheet of filtering material held between the opposite end walls of the nested trough and maintained in spaced relation with the side and bottom walls of the inner and outer troughs by the staggered ribs thereon.

EMIL M. BRODERSEN.